United States Patent Office 2,749,248
Patented June 5, 1956

2,749,248

ORGANOPHILIC TITANIA POWDERS CONTAINING A POLYMERIZABLE ETHYLENIC MONOMER BOUND TO FRACTURED SURFACES THEREOF AND THEIR PREPARATION

Richard E. Benson, Claymont, Del., assignor to E. I. du Pont de Nemours and Company, Wilmington, Del., a corporation of Delaware No Drawing. Application May 9, 1952,
Serial No. 287,047

15 Claims. (Cl. 106—300)

This invention relates to modified titanium dioxide powders. More particularly, it relates to organophilic titania powders and to methods for their preparation.

Finely divided titania, i. e., finely divided titanium dioxide, is useful in many applications, e. g., in the textile industry as a delusterant, in the paint industry as a pigment, and in the electrical industry as a dielectric material. While titania powders of the previously known types have found extensive use in such applications, they have not been as satisfactory as desired in some applications because of their organophobic properties. Consequently, organophilic titania powders are desired for use in special applications.

It is an object of this invention to provide new modified titania powders and methods for their preparation. A further object is to provide titania powders having organophilic properties and methods for their preparation. Other objects will appear hereinafter.

The objects of this invention are accomplished by providing titania powders comprising finely divided titanium dioxide particles having a polymerizable ethylenic compound bound thereto in amount by weight equivalent to 0.41% to 5.0% carbon.

The process of this invention comprises grinding granular titanium dioxide, i. e., titanium dioxide in the form of granules or pellets having a particle size of at least 1 mm. diameter, to a fine powder in contact with an ethylenic compound capable of undergoing addition polymerization. The grinding of the coarse titania to fine particles provides active fractured titania surfaces which while freshly formed react with the polymerizable ethylenic compound. It has now been found that modified titania powders, e. g., organophilic titania powders, can be prepared by the process of this invention. The products of this invention are finely divided titania powders containing polymerizable ethylenic compounds bound thereto in amount by weight equivalent to 0.41% to 5.0% carbon. The combined ethylenic compounds can not be extracted from the titania by solvents for the homopolymers of the ethylenic compounds.

The process of this invention is conveniently carried out by grinding titania having a particle size of at least 1 mm. average diameter, e. g., sintered rutile pellets of about 4 mm. diameter, to a fine powder, preferably having a surface area of at least 0.1 m.$^2$/g., in the presence of an excess of a polymerizable ethylenic monomer, e. g., styrene, in a ball mill until the powder obtained contains organic material equivalent to at least 0.41% carbon.

The grinding operation is carried out at a temperature below that causing appreciable addition polymerization of the ethylenic monomer being employed. Operable temperatures range from —70° to 50° C. The exact temperature used in any particular case depends on the particular ethylenic compound being employed and on whether a stabilizer (i. e., a compound which inhibits addition polymerization) is present. Higher temperatures can be used when a stabilizer is present than when no stabilizer is used.

The time of grinding titania in the process of this invention varies over wide limits, grinding times ranging from 7 to 200 hours being suitable. The exact time depends on such factors as the surface area desired in the final powder, the content of ethylenic compound desired in the organophilic powder, and the hardness of the particular type of titania being ground. With respect to these factors, the longer times specified above are required to produce the products having the greater surface area and the higher carbon contents, and when the harder forms of titania are employed.

The amount of polymerizable ethylenic compound employed in the process of this invention is not critical. It is only essential that an amount of ethylenic compound be used in excess of that which combines with the freshly fractured titania. Preferably an amount of ethylenic monomer sufficient to cover the titania and the pebbles or other grinding aid being used in the ball mill is employed in order to obtain efficient grinding action.

The powdered modified titania and excess ethylenic compound are separated from the grinding aid, i. e., the pebbles or hard, dense cylinders employed in the ball mill, by decantation or filtration. In some cases it is desirable to add an organic solvent, e. g., benzene, to the reaction mixture and then separate the titania and organic solvent containing excess ethylenic compound from the grinding aid. The titania powder is conveniently separated from the excess ethylenic compound (and any solvent which may have been added) by filtering or centrifuging, the particular method selected depending on the particle size of the product. With coarse titania powders filtration is satisfactory, but with the more finely divided titania powders centrifugation is preferred. The separated titania powder is then washed with an organic solvent, e. g., hot benzene, centrifuged, and the washing and centrifuging process repeated one or more times. The washed titania powder is then dried, preferably in a vacuum oven at elevated temperature, e. g., 80–110° C. The resulting organophilic titania powder is suitable for use in various applications in which finely divided titania has heretofore been employed.

In another embodiment of this invention the titania can be ground in a ball mill in the presence of the vapor of the polymerizable ethylenic compound. This embodiment is particularly useful when low-boiling polymerizable compounds, e. g., butadiene, are employed as the modifier of the titania. In this modification the organophilic titania powder obtained as a product is easily separated from excess ethylenic monomer by vaporization of the latter.

Although the grinding of the coarse titania in the process of this invention is preferably carried out in an inert atmosphere, e. g., in an atmosphere of nitrogen, this is not essential as the formation of organophilic powders by grinding titania in the presence of an ethylenic polymerizable compound can be accomplished in an atmosphere of air.

While any form of titanium dioxide having an average particle size greater than 1 mm. diameter can be used in the process of this invention, it is preferred to employ titania particles having a size range of 1 to 10 mm. average diameter. Thus, common pigment grades of titanium dioxide are not satisfactory since particles of the extremely fine size of such pigments (of the order of 0.3 to 1 micron) are not fractured to an appreciable extent when subjected to ball milling. Since it is the freshly formed surface of a titania particle that is reactive with a polymerizable ethylenic monomer in the process of this invention, best results are obtained when a form of titania which is easily fractured is used. Operable forms of titania include the titanium dioxide minerals of different crystalline form, viz., rutile, anatase and brookite. Especially suitable forms of titanium dioxide particles are the hard products obtained by sintering, or by pelleting and sintering finely divided titanium dioxide. Sintered rutile gives especially good results in the process of this invention. In these sintered titanium dioxide products the individual fine pigment particles are agglutinated into larger masses of titania. During the grinding step, these agglutinated particles are fractured and reactive surfaces result.

The finer the titanium dioxide particles are ground, i. e., the greater the surface area of the product, the larger will be the number of freshly formed surfaces. Consequently, the finer particles, on a weight basis, will combine with more of the ethylenic monomer than will the coarser particles. Therefore, in a modified freshly fractured titania powder of any given average particle size and carbon content made by the process of this invention, the individual finer particles making up the composite powder will have a higher carbon content than the individual coarser particles in the powder.

The titania powders produced by the process of this invention contain organic material bound to the titania in amount equivalent to 0.41 to 5.0% carbon. Those containing 0.5 to 5.0% carbon are highly organophilic. They retain their organophilic characteristics after thorough extraction with organic solvents and retain a large portion of their organophilic properties after refluxing in boiling water for one day and longer.

A stabilizer, i. e., a compound which inhibits addition polymerization of ethylenic compounds, is preferably employed in the process of this invention, although it is not essential. The stabilizer reduces the amount of polymerization of the ethylenic compound outside the system, that is, it reduces the amount of polymer which is not bound to the titania particles. Examples of conventional polymerization inhibitors or stabilizers that can be used include hydroquinone, pyrogallol, catechol, tertiary butylcatechol, beta-naphthol, copper resinate, naphthylamine and other antioxidants.

The process of this invention is illustrated in greater detail by the following examples, in which the proportions of ingredients are expressed in parts by weight unless otherwise specified.

*Example I*

A porcelain ball mill is charged with about half its volume of a dense cylindrical grinding medium that is manufactured as a replacement for the conventional pebbles in a ball mill. There are then added 135 parts of stabilized styrene and 90 parts of sintered rutile. The sintered rutile is in the form of pellets about 4 mm. x 4 mm. and is prepared from rutile pigment by pelleting and sintering at 1200° C. The pellets have a density approaching the theoretical density for rutile mineral. The ball mill is rotated for 60 hours at room temperature (about 25° C.). The product is a thick mass containing the grinding medium distributed throughout it. The product is suspended in benzene for one hour and allowed to stand for 60 hours. After separating the grinding aid, the benzene suspension of titania powder is centrifuged. The extraction with benzene and centrifuging is repeated for a total of three times. The final powder is allowed to air dry and finally heated in a vacuum oven at 70° C. and 50 mm. mercury pressure until dry (24 hours).

The rutile powder obtained contains 1.71% carbon and 0.20% hydrogen, and is largely hydrophobic and organophilic to benzene. The analyses in this and other Examples are the averages of duplicate determinations.

A portion of the organophilic titania powder of Example I is extracted in a Soxhlet extractor with benzene for 24 hours. After this extraction, the dried product contains 1.16% carbon and 0.18% hydrogen. It is completely organophilic to butyl alcohol and is somewhat hydrophobic.

Another portion of the organophilic titania powder of Example I is refluxed with a mixture of equal volumes of acetone and water for 24 hours. After isolating the resulting product by filtration and drying, the titania powder is found to contain 1.17% carbon and 0.22% hydrogen. Upon partitioning, approximately half of the material goes to the butyl alcohol-water interface. The remainder of the powder is dispersed in the water layer.

The organophilic and hydrophobic characteristics of the titania powder of this invention are determined by observing the behavior of the powder when agitated in water and in a mixture of water and an immiscible organic liquid, e. g., benzene or 1-butanol. In this test a small portion of the finely divided titania powder is placed in a glass container and a small volume of water added to it. After agitating the mixture it is observed. If the powder is wet by the water, it is hydrophilic and, if not, it is hydrophobic. A small portion of a water immiscible liquid, e. g., benzene, is then added to the titania powder-water mixture and agitated briskly again. If the titania powder remains suspended in the aqueous layer, it is organophobic. However, if the titania powder is suspended in the organic layer and none of it is in the aqueous layer, it is completely organophilic. In many cases particles of modified titania settle at the interface between the water and the organic liquid, and these are considered to be largely organophilic.

*Example II*

A porcelain ball mill containing about one-half its volume of dense cylindrical grinding media, is charged with 304 parts of sintered rutile pellets of the type described in Example I and 405 parts of styrene. The rutile is ground for three days at room temperature (25° C.). The resulting product is extracted with three 350-part portions of hot benzene and isolated by centrifugation. The product is allowed to dry in air for 16 hours and is then heated in a vacuum oven at 110° C. for 16 hours.

The resulting product is completely hydrophobic and is organophilic to benzene. Analysis indicates the modified titania powder has an organic content corresponding to 1.88% carbon and 0.20% hydrogen. Surface area measurements by determination of nitrogen absorption by this modified titania powder indicate it to have a surface area corresponding to 2.4 m.$^2$/gram.

A portion of the modified titania powder of Example II is extracted with benzene in a Soxhlet extractor for 24 hours. The extracted product is completely hydrophobic and is organophilic to benzene. Analysis of the extracted powder indicates it to have an organic content corresponding to 1.20% carbon and 0.16% hydrogen.

Three parts of the styrene-modified rutile powder of Example II is refluxed with 150 parts of water containing 1 part of the alkyl aryl polyether known commercially as "Triton" N–100 for 24 hours. The titania powder is isolated from the water by filtration, washed with water, then with acetone, and finally extracted twice with hot benzene. The product is completely organophilic to benzene and is largely hydrophobic. Analysis indicates it to contain organic material equivalent to 1.14% carbon and 0.19% hydrogen.

*Example III*

A ball mill about half filled with the dense cylindrical grinding aid of the previous examples is charged with a mixture of 75 parts of sintered rutile pellets of the type described in Example I and about 95 parts of beta-dimethylaminoethyl methacrylate. The rutile is ground for six days at room temperature (about 25° C.). The product, after separation from the grinding aid employed, is extracted three times with warm acetone and isolated by centrifugation.

The dry product is somewhat organophilic to butyl alcohol and contains organic material equivalent to 0.52% carbon and 0.25% hydrogen.

*Example IV*

A ball mill approximately half filled with dense cylindrical grinding aid is charged with a mixture of 80 parts of sintered rutile pellets of the type described in Example I and about 90 parts of stabilized methyl methacrylate and 81 parts of stabilized acrylonitrile. The rutile is ground in the presence of these ethylenic monomers for five days at room temperature (25° C.). After removing the grinding aid, the titania powder is extracted three times with warm actone and recovered by centrifugation.

The dry product is somewhat organophilic to butyl alcohol. Analysis indicates the modified titania powder to have an organic content equivalent to 0.41% carbon and 0.16% hydrogen.

*Example V*

A ball mill approximately half filled with dense cylindrical grinding aid is charged with 90 parts of styrene and 25 parts of sintered rutile particles ranging from 1 to 10 mm. in longest dimension (prepared by heating the fine titanium dioxide pigment known as rutile "seed" to 400° C. for 15 hours and cooling under nitrogen into a hard glassy mass which is then broken up into particles of the previously mentioned size range). The ball mill is flushed out with nitrogen and the mill is rotated for 24 hours at room temperature (25° C.). After separating from the grinding aid, the finely ground rutile powder is extracted three times with warm benzene and isolated by centrifugation.

After drying in a vacuum oven at 110° C., the product analyzes 1.87% carbon and 0.37% hydrogen. Surface area measurements by nitrogen absorption indicate this modified rutile powder has a surface area of 23.7 m.$^2$/gram. The product is almost completely organophilic to butyl alcohol.

A portion of the styrene-modified rutile powder of Example V is extracted with benzene in a Soxhlet extractor for 24 hours. The extracted product is almost completely organophilic to butyl alcohol and contains combined organic material equivalent to 1.43% carbon and 0.41% hydrogen.

Another portion of the styrene-modified rutile powder of Example V is refluxed in a mixture of 150 parts of water, 50 parts of acetone and 1 part of the alkyl aryl polyether known commercially as "Triton" N–100 for 24 hours. The resulting product is isolated by centrifugation, washed with water, washed twice with acetone and finally extracted twice with hot benzene. After drying, the powder contains combined organic material equivalent to 1.35% carbon and 0.4% hydrogen. It is approximately 50% organophilic to butyl alcohol.

*Example VI*

A ball mill containing approximately half its volume of dense cylindrical grinding aid is charged with 145 parts of stabilized styrene and 25 parts of rutile particles of 1 to 10 mm. particle size prepared by heating the titanium dioxide known as rutile "seed" at 600° C. for 18 hours, cooling under nitrogen and breaking into coarse particles. The charged ball mill is flushed with nitrogen and then rotated for 24 hours at room temperature (25° C.). After separating the product from the grinding aid, the product is extracted three times with warm benzene, isolated by centrifugation and dried at 80° C. and 50 mm. Hg. pressure.

The resulting styrene-modified rutile powder has a carbon content of 0.98% and a hydrogen content of 0.25%. The product is approximately 50% organophilic to butyl alcohol.

The styrene-modified rutile powder of Example VI is extracted for 24 hours with benzene in a Soxhlet extractor. After drying, the product analyzes 0.78% carbon and 0.25% hydrogen. As in the case of the original modified rutile powder, this extracted product is approximately 50% organiphilic to butyl alcohol.

Another portion of the styrene-modified rutile powder of Example VI is refluxed with water containing the alkyl aryl polyether surface-active agent as in the preceding example. The washed and extracted product analyzes 0.72% carbon and 0.29% hydrogen.

In addition to the ethylenic compounds mentioned in the examples, any other polymerizable ethylenic compounds, particularly those containing from one to two ethylenic double bonds as the sole aliphatic carbon-to-carbon unsaturation, can be reacted with freshly fractured titania in the process of this invention to produce organophilic titania powders. Specific examples of other polymerizable ethylenic compounds, including polymerizable vinyl monomers, which can be used are monoolefins, e. g., ethylene and isobutylene; halogenated ethylenes, e. g., tetrafluoroethylene; conjugated dienes, e. g., butadiene and isoprene; vinyl esters, e. g., vinyl acetate, vinyl chloride, and vinyl fluoride; vinylidene compounds, e. g., vinylidene chloride; esters of alpha-methylene monocarboxylic acids, e. g., methyl methacrylate and isobutyl methacrylate; and unsaturated anhydrides, e. g., maleic anhydride.

The type of grinding equipment used in the process of this invention is not critical. Conventional ball mills constructed of glass, porcelain or other materials of construction inert to the materials being ground are satisfactory. The grinding aid used in the ball mills can be ordinary flint pebbles or any dense cylindrical grinding aid such as that sold commercially under the name "Burundum." In addition to conventional ball mills, steel containers capable of being rocked or shaken and charged with the titania and polymerizable ethylenic monomer in the presence of a grinding aid can also be employed. Other types of grinding equipment which can be used include hammer mills, attrition mills and the like.

The modified titania powders of this invention are useful in many applications in which finely divided titania is now employed, e. g., as delusterants for synthetic polymer fibers, as pigments, and as dielectric materials in electrical applications.

As many apparently widely different embodiments of this invention may be made without departing from the spirit and scope thereof, it is to be understood that this invention is not limited to the specific embodiments thereof except as defined in the appended claims.

I claim:
1. A method for preparing a finely divided titania powder having organophilic properties which comprises grinding and fracturing coarse granular titanium dioxide having a particle size of at least 1 mm. average diameter in contact with a polymerizable ethylenic monomer containing from one to two ethylenic double bonds as the sole aliphatic carbon-to-carbon unsaturation, and at a temperature below that at which polymerization of said monomer occurs, thereby providing freshly fractured titanium dioxide surfaces reactive with said monomer, continuing said grinding and fracturing of the coarse granular titanium dioxide in contact with said monomer until the titanium dioxide particles are ground to a fine powder having a surface area of at least 0.1 m.$^2$/g. and said monomer becomes bonded to active fractured surfaces thereof, and separating as the resulting product a finely divided titania powder containing said monomer bonded to the fractured surfaces thereof and having organophilic properties.

2. A method for preparing a finely divided titania powder having organophilic properties which comprises grinding and fracturing coarse granular titanium dioxide having a particle size of at least 1 mm. average diameter in contact with a polymerizable vinyl monomer containing the vinyl ethylenic double bond as the sole aliphatic carbon-to-carbon unsaturation, and at a temperature below that at which polymerization of said monomer occurs, thereby providing freshly fractured titanium dioxide surfaces reactive with said monomer, continuing said grinding and fracturing of the coarse granular titanium dioxide in contact with said monomer until the titanium dioxide particles are ground to a fine powder having a surface area of at least 0.1 m.²/g. and said monomer becomes bonded to active fractured surfaces thereof, and separating as the resulting product a finely divided titania powder containing said monomer bonded to the fractured surfaces thereof and having organophilic properties.

3. A method for preparing a finely divided titania powder having organophilic properties which comprises grinding and fracturing coarse granular titanium dioxide having a particle size of at least 1 mm. average diameter in contact with styrene monomer, and at a temperature below that at which polymerization of said styrene monomer occurs, thereby providing freshly fractured titanium dioxide surfaces reactive with said styrene monomer, continuing said grinding and fracturing of the coarse granular titanium dioxide in contact with said styrene monomer until the titanium dioxide particles are ground to a fine powder having a surface area of at least 0.1 m.²/g. and said styrene monomer becomes bonded to active fractured surfaces thereof, and separating as the resulting product a finely divided titania powder containing said styrene monomer bonded to the fractured surfaces thereof and having organophilic properties.

4. A method for preparing a finely divided titania powder having organophilic properties comprising grinding and fracturing coarse granular sintered rutile having a particle size of at least 1 mm. average diameter in contact with styrene monomer, and at a temperature below that at which polymerization of said styrene monomer occurs, thereby providing freshly fractured rutile surfaces reactive with said styrene monomer, continuing said grinding and fracturing of the coarse granular sintered rutile in contact with said styrene monomer until the rutile particles are ground to a fine powder having a surface area of at least 0.1 m.²/g. and said styrene monomer becomes bonded to active fractured surfaces thereof, and separating as the resulting product a finely divided titania powder containing said styrene monomer bonded to the fractured surfaces thereof and having organophilic properties.

5. A dry finely divided titania powder having organophilic properties comprising as the sole inorganic component fractured titanium dioxide particles having a surface area of at least 0.1 m.²/g. and as an organic component a polymerizable ethylenic monomer, containing from one to two ethylenic double bonds as the sole aliphatic carbon-to-carbon unsaturation, said polymerizable ethylenic monomer being bound to fractured surfaces of said titanium dioxide particles in amount by weight equivalent to 0.41 to 5.0% carbon, and said titania powder being the product obtained by the process of claim 1.

6. A dry finely divided titania powder having organophilic properties comprising as the sole inorganic component fractured titanium dioxide particles having a surface area of at least 0.1 m.²/g. and as an organic component a polymerizable vinyl monomer, containing the vinyl ethylenic double bond as the sole aliphatic carbon-to-carbon unsaturation, said polymerizable vinyl monomer being bound to fractured surfaces of said titanium dioxide particles in amount by weight equivalent to 0.5 to 5.0% carbon, and said titania powder being the product obtained by the process of claim 2.

7. A dry finely divided titania powder having organophilic properties comprising as the sole inorganic component fractured titanium dioxide particles having a surface area of at least 0.1 m.²/g. and as an organic component styrene monomer, said styrene monomer being bound to fractured surfaces of said titanium dioxide particles in amount by weight equivalent to 0.5 to 5.0% carbon, and said titania powder being the product obtained by the process of claim 3.

8. A dry finely divided titania powder having organophilic properties comprising as the sole inorganic component fractured sintered rutile particles having a surface area of at least 0.1 m.²/g. and as an organic component styrene monomer, said styrene monomer being bound to fractured surfaces of said rutile particles in amount by weight equivalent to 0.5 to 5.0% carbon, and said titania powder being the product obtained by the process of claim 4.

9. A method for preparing a finely divided titania powder having organophilic properties as set forth in claim 1 wherein said polymerizable ethylenic monomer contains a polymerization inhibitor.

10. A method for preparing a finely divided titania powder having organophilic properties as set forth in claim 1 wherein said polymerizable ethylenic monomer is beta-dimethylaminoethyl methacrylate.

11. A method for preparing a finely divided titania powder having organophilic properties as set forth in claim 1 where in said polymerizable ethylenic monomer is methyl methacrylate.

12. A method for preparing a finely divided titania powder having organophilic properties as set forth in claim 1 wherein said polymerizable ethylenic monomer is acrylonitrile.

13. A dry finely divided titania powder having organophilic properties comprising as the sole inorganic component fractured titanium dioxide particles having a surface area of at least 0.1 m.²/g. and as an organic component beta-dimethylaminoethyl methacrylate monomer, said monomer being bound to fractured surfaces of said titanium dioxide particles in amount by weight equivalent to 0.41 to 5.0% carbon, and said titania powder being the product obtained by the process of claim 1 when said polymerizable ethylenic monomer is beta-dimethylaminoethyl methacrylate monomer.

14. A dry finely divided titania powder having organophilic properties comprising as the sole inorganic component fractured titanium dioxide particles having a surface area of at least 0.1 m.²/g. and as an organic component methyl methacrylate monomer, said monomer being bound to fractured surfaces of said titanium dioxide particles in amount by weight equivalent to 0.41 to 5.0% carbon, and said titania powder being the product obtained by the process of claim 1 when said polymerizable ethylenic monomer is methyl methacrylate monomer.

15. A dry finely divided titania powder having organophilic properties comprising as the sole inorganic component fractured titanium dioxide particles having a surface area of at least 0.1 m.²/g. and as an organic component acrylonitrile monomer, said monomer being bound to fractured surfaces of said titanium dioxide particles in amount by weight equivalent to 0.41 to 5.0% carbon, and said titania powder being the product obtained by the process of claim 1 when said polymerizable ethylenic monomer is acrylonitrile monomer.

References Cited in the file of this patent

UNITED STATES PATENTS

| | | |
|---|---|---|
| 2,008,746 | Collins | July 23, 1935 |
| 2,180,721 | Roon et al. | Nov. 21, 1939 |
| 2,205,985 | Sapointe | June 25, 1940 |
| 2,318,959 | Muskat et al. | May 11, 1943 |
| 2,644,772 | Kaye | July 7, 1953 |